Aug. 27, 1963  W. R. KING  3,101,909
PRESSURE CONTROL IN CYCLIC PNEUMATIC CONVEYOR SYSTEMS
Filed Oct. 16, 1961
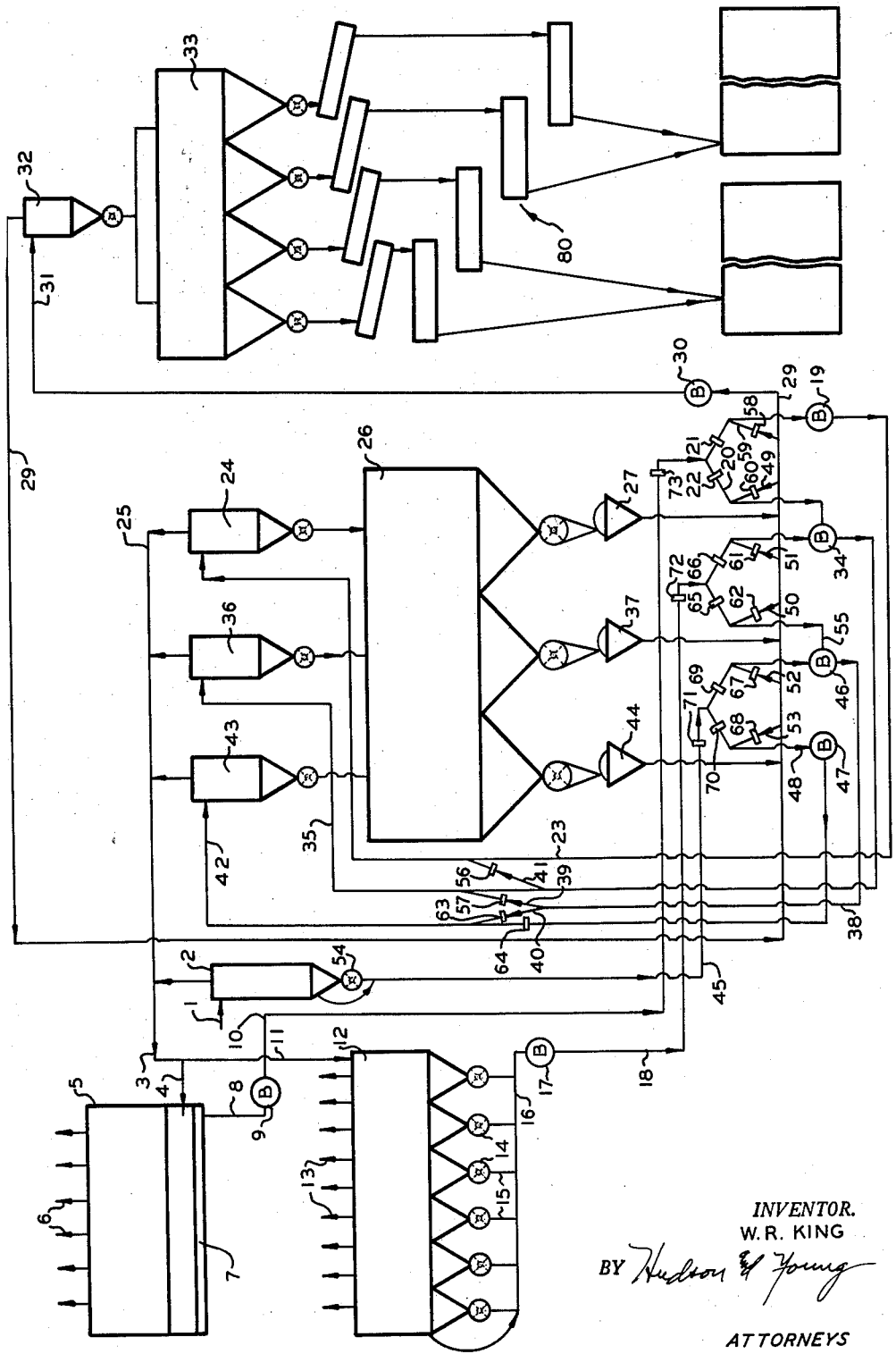
INVENTOR.
W.R. KING
BY Hudson & Young
ATTORNEYS

United States Patent Office 3,101,909
Patented Aug. 27, 1963

3,101,909
PRESSURE CONTROL IN CYCLIC PNEUMATIC
CONVEYOR SYSTEMS
William R. King, Borger, Tex., assignor to Phillips
Petroleum Company, a corporation of Delaware
Filed Oct. 16, 1961, Ser. No. 145,281
6 Claims. (Cl. 241—25)

This invention relates to operation of pneumatic conveyor systems. In one aspect, it relates to pressure control in pneumatic conveyor systems. In another aspect, it relates to pressure control in pneumatic conveyor systems wherein gases are intentionally or inadvertently added to the pneumatic conveyor system separately or in conjunction with material being conveyed.

In some pneumatic conveyor systems, a gas or gases are intentionally or inadvertently, intermittently or continuously added to the system. In vacuum systems leakage of atmospheric air into the system can occur unless elaborate precautions are taken against leakage. In some systems, gases added to the system accompany the material being conveyed. In the production of furnace carbon black, it has been found advantageous to convey the produced black from one point to another pneumatically. The furnace effluent comprises hot gases carrying carbon black in suspension. After cooling the effluent, it is conducted to carbon black separation or recovery means, such as a high potential electrical precipitation means or a bag filter means. This latter means is a preferred means for recovery of carbon black from the furnace effluent gases. Since pieces of commercial equipment frequently must be positioned in somewhat widely separated areas, the material in process must be conveyed from one process point to another. Conveying of carbon black pneumatically has been found advantageous.

In some carbon black production plants, the black is separated from furnace effluent gases by a system of cyclonic separators, and bag filters, coupled with pneumatic conveyors for transfer of the black from one process point to another.

Micropulverizers are also used for treating the black to reduce grit inadvertently present in the black. Gases accompanying the black into and issuing from the micropulverizers therewith are passed with the black into subsequent pneumatic conveying systems. The issuance of the gases with the black from the micropulverizers is continuous and markedly increases pneumatic pressure in such cyclic systems.

I have discovered a method and means for regulating pneumatic pressure in pneumatic conveying systems in which gases are unintentionally added to the conveying system with the material to be conveyed.

An object of this invention is to provide a method for the regulation of pneumatic pressure in closed pneumatic conveying systems. Another object of this invention is to provide apparatus and a method for regulation of pneumatic pressure in pneumatic conveying systems. Still another object of this invention is to provide apparatus and a method for the regulation of pneumatic pressure in pneumatic conveying systems employed for the conveying of carbon black from one process point to another. Other objects and advantages of this invention will be realized upon reading the following description which, taken with the attached drawing, forms a part of this specification.

In the drawing the FIGURE illustrates, in diagrammatic form and in perspective, an assembly of apparatus for carrying out the method of this invention.

In the drawing reference numeral 1 identifies a conduit leading cooled carbon black furnace effluent from a source, not shown, to the system of this invention. Conduit 1 leads this carbon black and suspending gases to a cyclone separator 2 in which a portion of the carbon black is separated from the suspending gases. The furnace effluent gases of reduced carbon black content leave the cyclone separator 2 and pass through a conduit 3 and thence to branch conduits 4 and 11 for passage to bag filter systems 5 and 12, respectively. The equipment, that is, the bags and other equipment in these bag filter systems, will not be described in detail since the specific construction thereof plays no part in this invention. However, in bag filter system 5, gases freed from carbon black leave the filter through vent stacks 6 and the separated carbon black leaves by way of a screw conveyor 7. In the bag filter system 12, gases free of carbon black leave by way of vents or vent stacks 13 while the filtered carbon black leaves by way of rotary valves 14 and conduits 15. These conduits 15 lead the black to a conduit 16 for removal from the filter. A conduit 8 leads from screw conveyor 7 for passage of the separated carbon black to the suction side of a blower 9 which, in turn, blows the carbon black, along with gases accompanying the carbon black, through a conduit 10 while conduit 16 passes carbon black from bag filter 12 to the suction side of blower 17. One end of conduit 16 communicates with the filter 12 in such a manner that gases from within the filter pass through conduit 16 and assist in transfer of the carbon black from the conduits 15 to the suction side of the blower 17. Blower 17 transmits or blows this carbon black and suspending gases through a conduit 18.

From blower 9 gases and carbon black are transmitted through conduit 10 to a blower 19 which blows the carbon black and suspending gases through a conduit 23 into a cyclonic separator 24.

Conduit 18 conveys gases and carbon black from blower 17 to a blower 34 which, in turn, passes the black and gases through a conduit 35 to a cyclonic separator 36. One end of a conduit 45 communicates with the cyclonic separator 2 in such a manner that a stream of gas passes through conduit 45 from the separator thereby entraining carbon black passing a rotary valve 54 for conveying purposes. This stream of gas and suspended carbon black passes on through conduit 45 to a blower 46 which passes the black and gas through a conduit 38 and through either conduit 39 or conduit 40. When the flow is through conduits 40 and 42, it passes to a cyclonic separator 43. When the gases and black pass through branch conduit 39, they pass through conduit 35 to the separator 36. The carbon black separated in the cyclonic separators 24, 36 and 43 passes into a surge tank 26 while the gases separated in these separators are passed through a conduit 25 and are combined with the gases and carbon black from separator 2.

The blowers 19, 34 and 46, along with a blower 47, are so arranged with piping that one of these blowers can be down for maintenance or repair purpose and the apparatus still remain in an operable condition. To remove blower 19 from operation, the black and suspending gases from conduit 10 are passed through a by-pass conduit 20 into the blower 34. If blower 34 is to be removed from service, the black and suspending gases from conduit 10 are passed into blower 19 while the gases and black from conduit 18 are passed through a by-pass conduit 55 into blower 46. Also, if blower 46 is to be removed from service, the black and gases from conduit 18 are passed to blower 34 while the gases and black from conduit 45 are passed through a branch pipe 48 into blower 47. Conduit 38, leading from blower 46 which, as mentioned before, communicates with branch pipes 39 and 40, is arranged in this manner so that only three cyclone separators, that is separators 24, 36 and 43, are required for use with the four blowers 19, 34, 46 and 47. In this manner cost of equipment is minimized.

When black and gases are passed through conduit 10 into blower 19, a disc blind 22 is positioned in the by-pass conduit 20 and a disc blind 21 is removed from conduit 10. Similarly, when black and gases from conduit 18 are to be passed to blower 34, a disc blind 66 is removed from conduit 18 and a disc blind 65 is inserted in the by-pass conduit 55. When gases and black from conduit 18 are to be passed to blower 46, the disc blind 65 is removed and the disc blind 66 is inserted into conduit 18 at the point illustrated. Also, when carbon black and gases from conduit 45 are to be passed to blower 46, a disc blind 69 is removed from conduit 45 and a disc blind 70 is inserted in the by-pass conduit 48. Alternately, when the black from conduit 45 is to be passed to blower 47, the disc blind 70 is removed from conduit 48 and the disc blind 69 is inserted in the conduit 45. Disc blinds 57 and 63 are provided in branch conduits 39 and 40, respectively, for directing the flow of gases and black from conduit 38 either to the cyclone separator 36 or 43 as desired.

The bottom of surge tank 26 is arranged so as to funnel carbon black to micropulverizers 27, 37 and 44. These micropulverizers are arranged so as to discharge the pulverized black into a conduit 29. This conduit 29 leads the pulverized black to the suction side of a blower 30. The discharge side of blower 30 communicates with a conduit 31 for passage of the black to a cyclone separator 32 which separates the black from conveying gases and deposits the black in a surge vessel 33. This surge vessel 33 is so positioned as to discharge the black to a carbon black pelleting system 80. Cyclone separator 32 is connected with a conduit 27 for passage of separated gas back to the suction side of pump 30 in closed pneumatic conveying cycle.

A branch conduit 41 also communicates with conduit 35 in case the discharge from blower 34 is desired to be passed into discharge conduit 23. When the discharge from blower 34 is passed through branch conduit 41 and the discharge from conduit 38 is passed through the branch conduit 40, then feed material does not enter cyclone separator 36 and this piece of equipment can be repaired or removed from service. Branch conduit 41 is provided with a disc blind 56.

As mentioned hereinbefore, when carbon black passes through micropulverizers such as 27, 37 and 44, a relatively large volume of entrained gases is liberated from the black as free gas. This large volume of gas passes from the pulverizers with the treated black into the conduit 29 and thence to the suction side of blower 30. Thus, relatively large volumes of gases are added to conduit 29. This addition of gases markedly increases the amount of gases in this cyclic conduit transfer system. Thus, I have found that by providing vent conduits communicating with conduit 29 at points therein relatively close to the points of addition of this added gas, pressure in this closed conduit system can be regulated within desired limits. In this manner a vent conduit 59 containing a disc blind 58 leads from conduit 29 between micropulverizer 27 and blower 30 to conduit 10. This vent conduit vents gases from a high pressure portion of conduit 29 into conduit 10 so that the material vented from conduit 29 passes on through conduit 10 to the suction side of blower 19 and the carbon black and entraining gases pass on through conduit 23 to the cyclone separator 24 for return of carbon black to the surge tank 26.

Likewise, a vent conduit 49 connects conduit 29 with by-pass conduit 20 and vented gases from conduit 29 pass through this branch conduit 20 into blower 34 with the black and gases passing through conduit 35 to separator 36 for addition of the black to the surge tank 26. Branch or vent conduit 49 is provided with a disc blind 60 for opening or closing the vent conduit 49. A pair of vent conduits 50 and 51 communicate conduit 29 between micropulverizer 37 and blower 30 with conduit 18 and branch conduit 55, respectively. These vent conduits 50 and 51 are provided with disc blinds 61 and 62, respectively, for regulation or otherwise opening and closing of the vent conduits. Similarly, a pair of vent conduits 52 and 53 communicate conduit 29 between micropulverizers 37 and 44 with conduit 45 and branch conduit 48, respectively. These latter vent conduits are provided with disc blinds 67 and 68, respectively, for opening or closing these vent conduits.

In case conduit 10 is a relatively long conduit, it is preferable to employ a pair of blowers for promoting proper pneumtaic conveying therein. Thus, as illustrated in the drawing, the blowers 9 and 19 are provided for this purpose. With blower 9 in operation, the pressure in conduit 10 downstream from blower 9 will be higher than the pressure upstream from the blower while the pressure in conduit 10 upstream of blower 19 may be higher than pressure in conduit 29 upstream of blower 30. A means for regulation of the pressure in conduit 10 immediately upstream of blower 19 may be required.

Pressure in conduit 10 just upstream of blower 19 must be lower than the pressure in conduit 29 just upstream of blower 30 to such an extent that when disc blind 58 is removed from the vent conduit 59, gases can pass freely from this portion of conduit 29 through the vent conduit 59 into that adjacent portion of conduit 10. To make certain that the pressure balance is proper, I provide an orifice plate 73 in conduit 10 just upstream of the point of juncture of the branch conduit 20 with conduit 10. In this manner, upon passage of the gases through conduit 10, the pressure drop occurs at this orifice plate. The pressure downstream from the orifice plate, whether the gases are suspended carbon black are passing on through conduit 10 to blower 19 or through by-pass conduit 20 to blower 34, has been reduced. Gases and black from conduit 29 easily pass into the suction side of blowers 19 and 34.

For the same reason, orifice plates 71 and 72 are inserted in conduits 45 and 18, respectively. However, while an orifice plate 71 is disclosed as being positioned in conduit 45 upstream of the juncture of conduit 45 with conduit 48, it is not ordinarily used.

The inlet end of conduit 8 receives carbon black from the bottom of bag filter 5 with the aid of screw conveyor 7. The blower 9, in addition to moving carbon black through conduit 8, withdraws a certain amount of gases from the bag filter 5. These gases are normally transferred on through conduit 10, blower 19, conduit 23, and are separated from carbon black in separator 24. The gases are then returned to conduit 3 by way of conduit 25 and to either the bag filter 5 or the bag filter 12. From these filters, excess gases are passed to vent stacks 6 or 13.

In one instance bag filter 5 provided 40,000 square feet of filter surface while bag filter 12 provided 65,000 square feet of filter surface. In this instance conduit 10 was a 10-inch I.D. pipe while conduit 18 was also a 10-inch I.D. pipe. Conduits 23, 35 and 42, branch conduits 39, 40, 20, 55 and 48 were also 10-inch inside diameter pipes. The closed pneumatic conveying cycle represented by conduits 29 and 31 and blower 30 was of somewhat greater capacity than the pipes and blowers heretofore mentioned. Thus, conduits 29 and 31 were 12-inch inside diameter pipes. The vent conduits 49, 50, 51, 52, 53 and 59 were 3-inch inside diameter pipes. The orifice plates 72 and 73 were conventional orifice plates with 5¾-inch diameter openings. Also, the disc blinds were swing blinds employed for ease of insertion and removal from their pipes.

In conveyor conduits 10 and 18 the normal operating pressures upstream of orifice plates 73 and 72 were 8.2 inches and 10.0 inches of water respectively. Downstream of the orifice plates in conduits 10 and 18 and upstream of blowers 19 and 34 the pressures were from 0 to 2 inches and from 0.4 to 2.8 inches of water respectively. The pneumatic pressure in conduit 45 at its point of juncture with conduit 48 was about 0 inch of water.

The pressure in the several portions of the closed pneumatic conduit portion of the system upstream of blower 30 in conduit 29 was —3.8 inches of water, i.e., 3.8 inches below atmospheric pressure, and the discharge pressure of the blower in conduit 31 was 15 inches of water. In conduit 29 at about its point of juncture with the discharge line from micropulverizer 44 was about 2.2 inches of water pressure. This —3.8 inches pressure at the inlet of blower 30 is caused by line drop. The micropulverizers can discharge into pressures of 2 or 3 inches water and since the pressure in conduit 29 at the points of micropulverizer inlets is between +2.2 and —3.8 inches of water, operation is satisfactory.

While certain embodiments of the invention have been described for illustrative purposes, the invention obviously is not limited thereto.

That which is claimed is:

1. In the production of furnace carbon black a method for preparing the carbon black for pelleting, comprising, cyclonically separating a gaseous effluent from a carbon black reactor and containing carbon black in suspension, from this treating step separately withdrawing carbon black and a gaseous effluent containing less carbon black in suspension than the first-mentioned gaseous effluent, separating in a bag filtering step the carbon black from the last-mentioned gaseous effluent and venting from the bag filtering step at least a portion of this effluent, pneumatically conveying the bag filtered carbon black to a second cyclonic separating step and therein separating carbon black containing entrained gases from the conveying gases, passing at least a portion of the latter separated conveying gases into said bag filtering step, micropulverizing this last mentioned carbon black containing said entrained gases whereby gases are liberated from the carbon black undergoing pulverizing and whereby the pressure of the liberated gases and micropulverized carbon black increases to a pressure higher than the pressure of the material entering the micropulverizing step, pneumatically conveying micropulverized carbon black and liberated gases to a third cylonic separating step and therein separating this carbon black from the conveying gases, this latter separated carbon black being the product of the operation, returning the separated conveying gases from the third separating step in closed cycle to the micropulverized carbon black and liberated gases pneumatic conveying step whereby pressure in the closed cycle conveying step increases to an undesirably high pressure, withdrawing a portion of the gases carrying carbon black in suspension immediately downstream of the point of juncture of the returned separated conveying gases with the micropulverized carbon black and liberated gases and introducing the withdrawn gases and suspended carbon black into the first mentioned pneumatic conveying step.

2. In the production of furnace carbon black a method for preparing the carbon black for wet pelleting, comprising, passing a stream of gases containing carbon black in suspension into a carbon black filtering operation and therein separating the carbon black from said gases, venting from the filtering operation a portion of the separated gases, blowing in a first conveying operation the separated carbon black with the remainder of the separated gases into a first cyclonic separation step and therein separating the conveyed carbon black containing entrained gases from the conveying gases and returning the separated conveying gases to the filtering operation, micropulverizing this conveyed and separated carbon black containing said entrained gases thereby liberating entrained gases from the carbon black whereby the pressure of the liberated gases and micropulverized carbon black increases to a pressure higher than the pressure of the separated carbon black and said portion of the separated gases at a low pressure portion of the blowing step, blowing in a closed cycle pneumatic conveying step the micropulverized carbon black and liberated gases into a second cyclonic separation step and therein separating the pneumatically conveyed carbon black from the conveying gases, returning these latter separated gases in said closed cycle to the blowing step thereof whereby pressure therein at the juncture of the micropulverized carbon black and liberated gases and the returned separated gases tends to increase to a value higher than a predetermined maximum pressure, withdrawing from the closed cycle pneumatic conveying step immediately downstream of said juncture a portion of the carbon black carrying gases, introducing the withdrawn carbon black carrying gases into the first conveying operation at said low pressure portion thereof whereby pressure in said closed cycle is maintained at a value below said predetermined maximum pressure, and withdrawing the second cyclonically separated carbon black from its separation step as the carbon black suitable for wet pelleting.

3. An apparatus comprising, in combination, a first conduit suitable for conveying gases containing carbon black in suspension, a first blower, said first conduit communicating operably with the inlet of said first blower, a first separator connected with an outlet from the system for gas, a second conduit communicating the outlet of said first blower with the inlet of said separator, a pulverizer, a third conduit communicating the lower portion of said first separator with the inlet of said pulverizer, a second blower, a fourth conduit communicating the outlet of said pulverizer with the inlet of said second blower, a second separator, a fifth conduit communicating the outlet of said second blower with the inlet of said second separator, a sixth conduit comunicating the top of said second separator with said fourth conduit, an outlet in the bottom of said second separator for outlet of separated material, and a seventh conduit communicating said fourth conduit immediately upstream of said second blower with said first conduit upstream of said first blower for relief of pressure from said fourth conduit by way of said seventh conduit and said first conduit to said first separator having an outlet for gas.

4. An apparatus comprising, in combination, a first conduit suitable for conveying gases containing carbon black in suspension, a first blower, said first conduit communicating operably with the inlet of said first blower, a first cyclonic separator connected with an outlet from the system for gas, a second conduit communicating the outlet of said first blower with the inlet of said separator, a micropulverizer, a third conduit communicating the lower portion of said first separator with the inlet of said micropulverizer, a second blower, a fourth conduit communicating the outlet of said pulverizer with the inlet of said second blower, a second cyclonic separator, a fifth conduit communicating the outlet of said second blower with the inlet of said second separator, a sixth conduit communicating the top of said second separator with said fourth conduit, an outlet in the bottom of said second separator for outlet of separated material, a seventh conduit communicating said fourth conduit immediately upstream of said second blower with said first conduit upstream of said first blower for relief of pressure from said fourth conduit to said first conduit and thence by way of said first blower, second conduit to said first cyclonic separator and a flow restricting means in said first conduit on the side of the juncture of said seventh conduit with said first conduit remote from said first blower.

5. The apparatus of claim 4 wherein said flow restricting means is an orifice plate.

6. The apparatus of claim 4 wherein said flow restricting means is a valve.

References Cited in the file of this patent

UNITED STATES PATENTS

| | | |
|---|---|---|
| 1,986,301 | Stockton | Jan. 1, 1935 |
| 2,580,581 | Niemitz | Jan. 1, 1952 |
| 2,899,139 | Hardinge | Aug. 11, 1959 |
| 2,917,374 | Wood | Dec. 15, 1959 |